Feb. 4, 1936. L. C. BEADLE 2,029,405
FLOAT CONTROL
Filed May 20, 1933
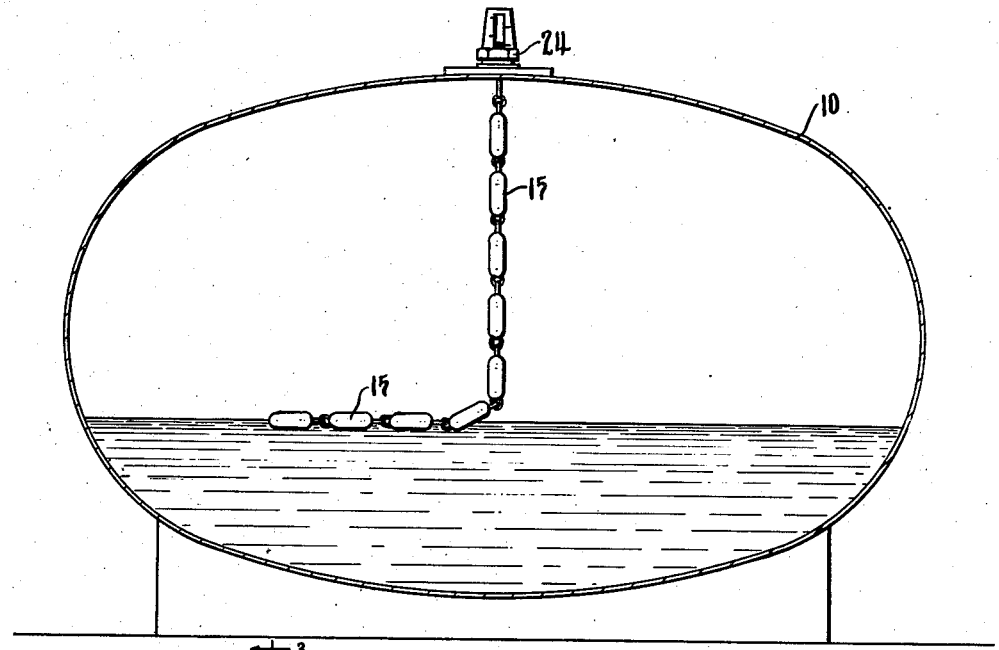
Fig. 1
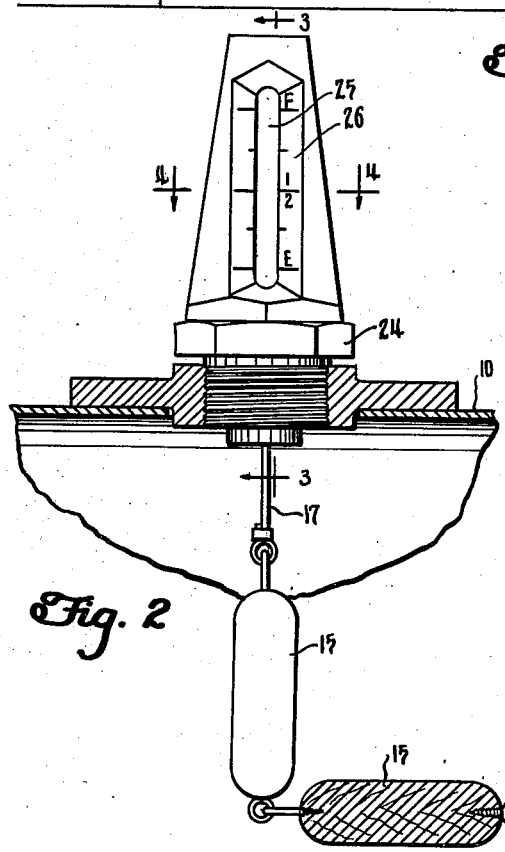
Fig. 2
Fig. 3
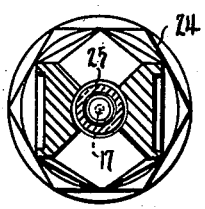
Fig. 4
INVENTOR.
Lynn C. Beadle
BY Daniel G. Cullen
ATTORNEY Patented Feb. 4, 1936

2,029,405

UNITED STATES PATENT OFFICE 2,029,405

FLOAT CONTROL

Lynn C. Beadle, Detroit, Mich., assignor of one-half to Karl B. Segall, Detroit, Mich.

Application May 20, 1933, Serial No. 671,978

4 Claims. (Cl. 73—82)

This application relates to float controls having uses in many arts, and particularly in the art of liquid level gauging.

An important object is the provision of an improved float construction for controlling the position of a member with respect to a datum in accordance with changes in distance between a liquid level and that datum.

Still another object is the provision of an improved float construction for the purposes aforesaid and comprising a flexible float in the nature of a chainlike articulated assemblage of a plurality of floats linked together.

Other objects and advantages will be apparent from the following description, wherein reference is made to the accompanying drawing, and wherein similar reference numerals designate similar parts throughout the several views.

In the drawing, Figs. 1 and 2 are fragmentary views of a liquid-containing tank installation and a float control therein;

Figs. 3 and 4 are sections taken substantially on the lines 3—3 and 4—4 of Fig. 2 and looking in the direction of the arrows.

In order to provide an indication of the quantity of liquid the tank 10 contains I preferably provide therewithin, and supported from a point near its top, a flexible float formed as a string or chain of loosely connected floats 15 adapted to hang freely so that those low enough may float on the liquid. The length of the float may approximate the depth of the tank, and it will be seen that the weight of that portion of the float which its supporting means is at any time called upon to carry is dependent upon the number of floats 15 which are hanging freely; those floating on the liquid in the tank, being supported by the liquid, exert no strain or load on the supporting means.

The uppermost float is shown connected as by means of a wire 17 to a support 20 which overlies and serves as the upper abutment for a supporting and counterbalancing compression spring 19. The lower end of the spring bears downwardly against a plug 22 forming the bottom of an indicator housing 24 carried by the upper portion of the tank 10 and forming a cage for a tube 25 of glass or other transparent material, in which tube slides the support 20. Suitable gaskets 21 seal the tube 25 and thus the entire assembly against escape of vapors from the tank. Beside the tube 25 and upon the body of the housing, calibrations 26 are provided whereby the position of the support 20 with respect thereto will indicate the quantity of liquid contained in the tank. These calibrations form a datum with respect to which the position of the support 20 and the liquid level may be regarded.

It will be apparent that the float construction here shown provides a means whereby the changes in liquid level will be reflected, in re- duced degree, by corresponding changes in the height of the member 20; and that the member 20, though shown as, need not be part of a gauge, but may be any part whose position with respect to a datum, is to be determined by the weight of the float suspended therefrom and not supported by the liquid; that the relative position of the supporting member 20 and the datum is controlled by the relative position of the liquid level and the same datum; and that a change in the vertical distance between the liquid level and the datum is reflected, to a reduced but proportional extent, by a corresponding change in the position of the member 20 with respect to the datum; and that this is accomplished by virtue of the flexible float provided by the links 15, which float provides a load on the member 20 which varies as the vertical distance between the liquid level and the datum varies; or varies in inverse correspondence to a rise or fall of the liquid level; and that the calibrations 26 on housing 24 need not be considered as the only datum, but that other means, such as the eye of an observer, may be regarded as a datum.

It will also be observed that the member or means 20 which is mounted to move with respect to a datum is intended to have a movement which is responsive to substantially any and all variations of the liquid level, even those which amount to less than the maximum possible variation of the liquid level; for this reason there are provided a large number (three or more) of float links 15 comprising the entire float, and the interspacing of the float links 15 is made a relatively small fraction of the maximum possible variation of the liquid level. For example, in a known embodiment where the float control is utilized in connection with an installation whose maximum possible variation of liquid level is 26 inches, there are provided five float links; the interspacing is one-fourth of 26 inches or 6½ inches. Consequently, even if no consideration were given to the fact that the float links 15 themselves are elongated, and even if the float links were made spherical, for every 6½ inches variation of liquid level there is a quarter step movement of the member 20, producing a corresponding quarter step indication on the gauge.

As a matter of fact, due to the fact that the float links 15 are elongated, having a greater dimension along the chain than across the chain perpendicular to the liquid level, the member 20 follows even slight variations of the liquid level. For example, if the liquid level were to vary a small part of 6½ inches, the member 20 would move a correspondingly small part of the quarter step between the "full" and "empty" markings, all due to the fact that the float links are elongated.

In order to understand this phenomenon, which is responsible for the superiority of elongated float links over spherical float links, it might be well to compare the case of a long log floating on water, and the case of a large sphere floating on the water. If one end of the log is lifted, as soon as that end of the log clears the liquid level, there is a load created on the lifting means. On the other hand, in the case of a sphere floating on liquid, if one side of the sphere be lifted, there is no load on the lifting means for quite a while, or until the sphere has rotated over center. This phenomenon explains why elongated links are much to be preferred over spherical links in the float control shown, and why the fact that the links are elongated insures a closer correspondence between the movement of the means 20 and the variations of liquid level than is provided alone by the characteristic that the interspacing of the float links is but a small fraction of the maximum possible variation of liquid level.

It will also be observed that the entire float is free ended; though one end is secured (to the means 20), the other end is free and completely detached from or unanchored with respect to the tank 10.

It will also be observed that the float control here shown is characterized by the fact that its operation is completely independent of the nature of the liquid whose level is responsible for the position of the means 20. The float control here shown is not affected or responsive in any way to the density or specific gravity of the liquid which supports the float, except insofar as it is necessary for the links 15 to be of less specific gravity than the liquid in order to constitute floats.

What I claim is:

1. For use with a liquid body and a datum, wherein the vertical distance between the body and the datum may vary, and wherein advantage is to be taken of changes or variations of said vertical distance, even those which amount to less than unity fractions of the maximum possible variation in said vertical distance, a float control comprising a counterbalanced means mounted to move with respect to the datum in accordance with changes in said vertical distance, the movement of the means generally corresponding to but being less than the change in said vertical distance, and a float supported by said means and by said liquid body, and forming a means-moving load for said means, which load varies in amount in correspondence to the changes in said vertical distance, the float comprising a chain-like assemblage of three or more individual relatively movable connected float links whose interspacing is a relatively small fraction of the maximum possible variation of said vertical distance whereby variations in said vertical distance equal to the float interspacing and thus amounting to less than unity fractions of the maximum possible variation are translated into corresponding, though reduced, movements of the means.

2. For use with a liquid body whose level may vary, and wherein advantage is taken of changes or variations of the liquid level, even those which amount to less than unity fractions of the maximum possible variation, a float control comprising a counterbalanced means mounted to move in accordance with a rise or fall of said level in an amount corresponding to but less than the rise or fall of said level, even when such rise or fall is a less than unity fraction of the maximum possible rise or fall, and a float supported by said means and by said liquid body and forming a means-moving load for said means, which load varies in amount in inverse correspondence to the rise or fall of said level, the float comprising a chain-like assemblage of three or more individual relatively movable connected float links whose interspacing is a relatively small fraction of the maximum possible rise or fall whereby rises or falls equal to the float interspacing and thus amounting to less than unity fractions of the maximum possible rise or fall are translated into corresponding, though reduced, movements of the means.

3. For use with a liquid body and a datum, wherein the vertical distance between the body and the datum may vary, and wherein advantage is to be taken of changes or variations of said vertical distance, even those which amount to less than unity fractions of the maximum possible variation, a float control comprising a counterbalanced means mounted to move with respect to the datum in accordance with changes in said vertical distance, the movement of the means generally corresponding to but being less than the change in said vertical distance, even when such variations in said vertical distance are less than unity fractions of the maximum possible variation in said vertical distance, and a float supported by said means and by said liquid body, and forming a means-moving load for said means, which load varies in amount in correspondence to the changes in said vertical distance, the float comprising a chain-like assemblage of three or more individual relatively movable connected float links whose interspacing is a relatively small fraction of the maximum possible variation of said vertical distance whereby substantially any variation in said vertical distance will be translated into a corresponding, though reduced, movement of the means, the float links being greater in dimension along the chain than across the chain perpendicular to the liquid level as they float thereon.

4. For use with a liquid body whose level may vary, and wherein advantage is taken of changes or variations of the liquid level, even those which amount to less than unity fractions of the maximum possible variation, a float control comprising a counterbalanced means mounted to move in accordance with a rise or fall of said level in an amount corresponding to but less than the rise or fall of said level, even when such rise or fall is a less than unity fraction of the maximum possible rise or fall, and a float supported by said means and by said liquid body and forming a means-moving load for said means, which load varies in amount in inverse correspondence to the rise or fall of said level, the float comprising a chain-like assemblage of three or more individual relatively movable connected float links whose interspacing is a relatively small fraction of the maximum possible rise or fall whereby substantially any rise or fall of said liquid level will be translated into a corresponding, though reduced, movement of the means, the float links being greater in dimension along the chain than across the chain perpendicular to the liquid level as they float thereon.

LYNN C. BEADLE.